(12) United States Patent
Warren

(10) Patent No.: US 8,388,746 B2
(45) Date of Patent: *Mar. 5, 2013

(54) FILTRATION SYSTEM FOR A COMPRESSOR STATION

(75) Inventor: Charles Warren, Azle, TX (US)

(73) Assignee: Warr-2-Bros, LLC, Huntsville, TX (US)

(*) Notice: Subject to any disclaimer, the term of this patent is extended or adjusted under 35 U.S.C. 154(b) by 76 days.

This patent is subject to a terminal disclaimer.

(21) Appl. No.: 13/033,808

(22) Filed: Feb. 24, 2011

(65) Prior Publication Data

US 2012/0073444 A1    Mar. 29, 2012

Related U.S. Application Data

(63) Continuation-in-part of application No. 12/889,106, filed on Sep. 23, 2010, now Pat. No. 8,323,388.

(51) Int. Cl.
*B01D 53/22* (2006.01)

(52) U.S. Cl. .............. 96/109; 96/134; 96/140; 96/147; 55/310; 55/319; 55/385.4; 55/420; 55/423; 55/467; 55/498; 55/505

(58) Field of Classification Search ............... 55/315.2, 55/DIG. 17, 385.3; 95/107, 123; 96/117.5, 96/125, 150, 136, 223; 137/2; 123/434, 123/198 E See application file for complete search history.

(56) References Cited

U.S. PATENT DOCUMENTS

| | | | |
|---|---|---|---|
| 3,672,129 A * | 6/1972 | Strople et al. | 96/223 |
| 4,015,959 A * | 4/1977 | Grote | 96/136 |
| 5,027,642 A * | 7/1991 | Wen et al. | 73/23.2 |
| 5,195,587 A | 3/1993 | Webb | |
| 6,684,945 B1 | 2/2004 | Meyers | |
| 6,793,701 B2 * | 9/2004 | Sun et al. | 55/315.2 |
| 7,350,581 B2 | 4/2008 | Wynn | |
| 7,544,234 B2 * | 6/2009 | Fornof | 96/117.5 |
| 7,569,095 B2 * | 8/2009 | Vanderstraeten et al. | 95/107 |
| 2007/0186770 A1 | 8/2007 | Heath | |
| 2010/0095845 A1 | 4/2010 | Mok | |
| 2011/0094593 A1 * | 4/2011 | Malm | 137/2 |

FOREIGN PATENT DOCUMENTS

CN    101525989    9/2009

OTHER PUBLICATIONS

Enardo Data Sheet; published; www.enardo.com; date: unknown; author: unknown.

* cited by examiner

*Primary Examiner* — Duane Smith
*Assistant Examiner* — Minh-Chau Pham
(74) *Attorney, Agent, or Firm* — Eric Karich

(57) ABSTRACT

A filtration system has a blowdown conduit and a filter unit. The blowdown conduit is adapted to be operably connected with a gas compressor station. The filter unit includes a filter housing, an inlet port, a pollution filter positioned within the filter housing to remove the pollutants from the vented gasses entering through the inlet port, and an exit port enabling the vented gasses to exit the filter housing once the pollutants have been removed by the pollution filter.

12 Claims, 2 Drawing Sheets

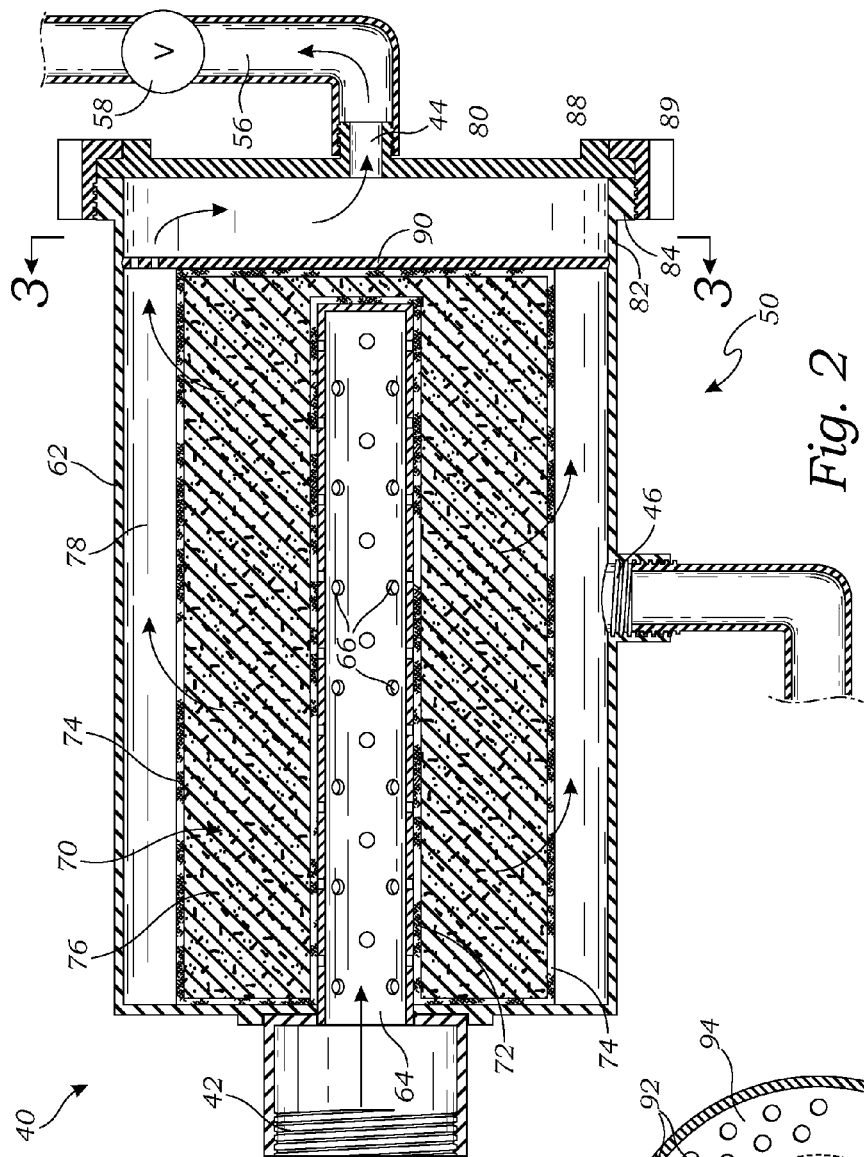
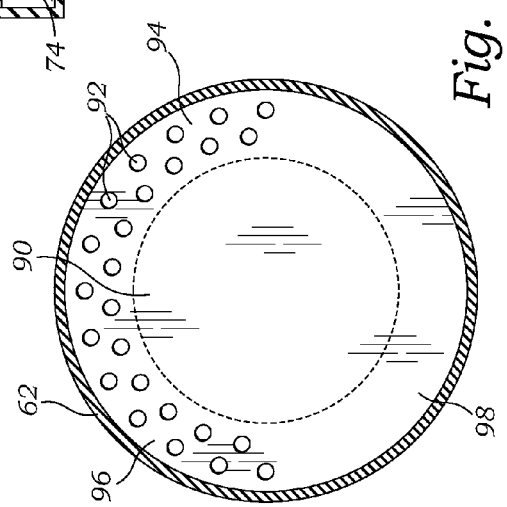

FILTRATION SYSTEM FOR A COMPRESSOR STATION

CROSS-REFERENCE TO RELATED APPLICATIONS

This application for a utility patent is a continuation-in-part of a previously filed utility patent, having the application Ser. No. 12/889,106, filed Sep. 23, 2010 now U.S. Pat. No. 8,323,388.

BACKGROUND OF THE INVENTION

1. Field of the Invention

This invention relates generally to filtration systems, and more particularly to a filtration system for filtering pollutants from vented gasses from a natural gas compressor station.

2. Description of Related Art

Natural gas distribution pipelines include compressor stations to re-compress the natural gas. These compressor stations must periodically be shut down, depressurized, and opened for maintenance and inspection. The gasses that are in the compressor station must be vented as part of this operation. A well known problem with venting the gasses is the pollution caused by venting the hydrocarbons, and associated chemicals (e.g., benzene, etc.).

There are many patents in the prior art that teach various methods of handling vented gasses in the field of hydrocarbon distribution.

Wynn, U.S. Pat. No. 7,350,581, teaches a vapor recovery apparatus for oil and gas well production that is used in combination with a liquid separator, a sales line, a holding tank, and a compressor linked to an engine. A first conduit extends from fluid communication with the holding tank to a compressor inlet, while a second conduit extends from a compressor outlet to fluid communication with the sales line. The vapor recovery apparatus also has an electronic controller that is connected to the engine and to a pressure sensor, which is in fluid communication with the gas in the tank. When the pressure reaches a certain level, the gas is captured and compressed by the compressor, and directed to the holding tank for future use.

Webb, U.S. Pat. No. 5,195,587, teaches in an oilfield production system in which a water driven jet pump is used to evacuate vapors from storage tanks to thereby recover the vapors and prevent emissions from passing to the atmosphere. The jet pump entrains the vapors in process water which is passed to a process separator already in the system. The gas is separated for recovery.

Heath et al., U.S. 2007/0186770, teaches a natural gas well vapor recovery processing system and method that is adapted for recovering gaseous hydrocarbons to prevent their release into the atmosphere. The natural gas is collected and compressed using a compressor for later collection and use.

Mok et al., U.S. 2010/0095845, teaches a vent gas adsorption system and a method of recovering volatile organic compounds (VOCs), more particularly to a vent gas adsorption system devised to effectively adsorb VOCs included in the vent gas and reduce VOC content of the vent gas, and a method of recovering VOCs.

Various forms of filters are, of course, well known. Meyers, U.S. Pat. No. 6,684,945, for example, teaches an air filter for a well is installed within a well casing of the well. The air filter forming an airtight seal around the well casing of the well, such that all the air that enters and exits the well must pass through the air filter. The air filter preferably includes a filter housing, at least one removable gasket and a removable filter cartridge installed within an opening extending through the filter housing. The air filter prevents dirt, dust, bacteria, gaseous chemicals, volatile organic compounds, (VOCs), insects and other air born contaminants from entering and possibly contaminating the well. An air filter may also be installed within a vent pipe extending through a well seal attached to the top of a well casing of a well.

The above-described references are hereby incorporated by reference in full.

The prior art teaches various methods for handling vented gasses to prevent undue pollution. However, the prior art does not teach a filtration system that is adapted to be operably engaged with a compressor station to direct vented gasses through a filter unit before venting these gasses to the atmosphere. The present invention fulfills these needs and provides further related advantages as described in the following summary.

SUMMARY OF THE INVENTION

The present invention teaches certain benefits in construction and use which give rise to the objectives described below.

The present invention provides a filtration system for filtering water and pollutants from vented gasses from a natural gas compressor station. The filtration system comprises a blowdown conduit adapted to be operably connected with the gas compressor station; and a filter unit comprising a filter housing; an inlet port; a pollution filter positioned within the filter housing to remove the pollutants from the vented gasses entering through the inlet port; and an exit port enabling the vented gasses to exit the filter housing once the pollutants have been removed by the pollution filter.

A primary objective of the present invention is to provide a filtration system having advantages not taught by the prior art.

Another objective is to provide a filtration system that is adapted to be operably engaged with a compressor station to direct vented gasses through a filter unit before venting these gasses to the atmosphere.

Another objective is to provide a filtration system that captures waste water from the compressor station so that the waste water may be properly disposed of without damage to the environment.

A further objective is to provide a filtration system that reduces the emission of pollutants to both the air and to ground water from compressor stations.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 2 is a sectional view of the filter unit illustrated in FIG. 1; and

FIG. 3 is a sectional view of the filter unit taken along line 3-3 in FIG. 2.

DETAILED DESCRIPTION OF THE INVENTION

Figure 1:
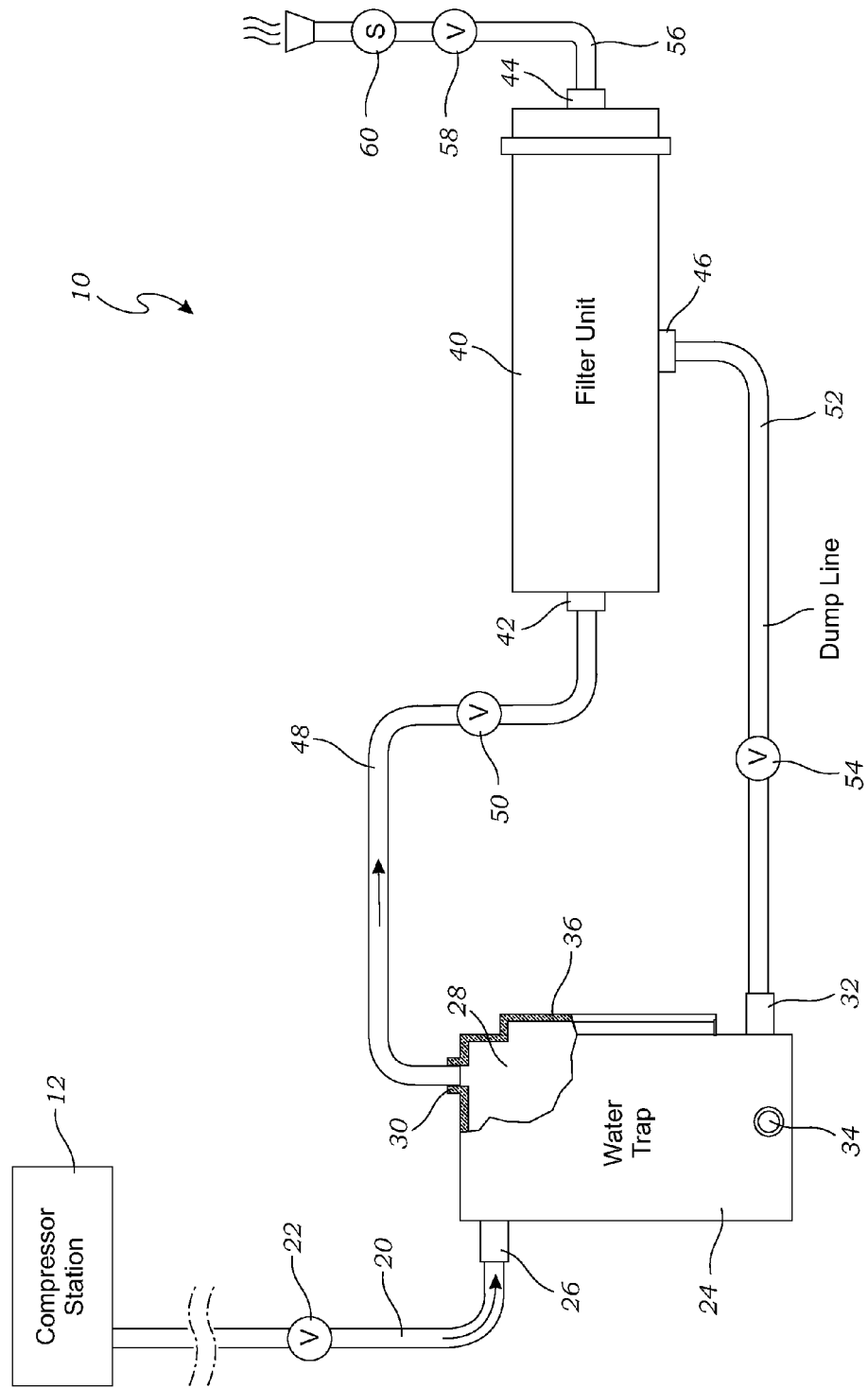
FIG. 1 is a block diagram illustrating one embodiment of a filtration system embodying the present invention, the filtration system including a water trap and a filter unit.

The above-described drawing figures illustrate the invention, a filtration system 10 for filtering water and pollutants from vented gasses from a natural gas compressor station 12.

FIG. 1 is a block diagram illustrating one embodiment of the filtration system 10. As shown in FIG. 1, the filtration system 10 is adapted to be installed at the end of a blowdown conduit 20 that is adapted to be operably connected with the compressor station 12. In this manner, when the compressor station 12 is taken off-line (e.g., for maintenance), the compressor station 12 may be vented to the atmosphere through the filtration system 10 without releasing undue pollution into the atmosphere.

As illustrated in FIG. 1, the blowdown conduit 20 may be any form of piping or similar conduit such as is well known in the art. The blowdown conduit 20 may include a blowdown valve 22 to prevent any flow from the filtration system 10 back into the compressor station 12. The blowdown conduit 20 may further include any additional features that may be desired or required by one skilled in the art.

In the embodiment of FIG. 1, the blowdown conduit 20 includes a water trap 24 for separating water from the vented gasses. The water trap 24 may include a trap inlet port 26 for receiving the vented gasses from the compressor station 12, and an internal chamber 28 that enables water to fall out of the incoming flow of the vented gasses. The trap inlet port 26 may be any form of port receiver, or fitting adapted to communicate with the compressor station 12, such as a port adapted to engage (e.g., threadedly or otherwise) an end portion of the blowdown conduit 20.

The water trap 24 may further include a trap outlet port 30 for allowing the vented gasses to exit the internal chamber 28 to flow to the filter unit 40, described in greater detail below. The water trap 24 may further include a trap water return port 32, which is described in greater detail below, and a trap water drain port 34 for periodically draining the water from the internal chamber 28. The trap water drain port 34 may be adapted to be operably engaged with a vacuum truck for draining the internal chamber 28 of the water trap 24. In alternative embodiments, the trap water drain port 34 may drain the water in an alternative manner; however, the water should be disposed of in an environmentally safe manner, since the water would be expected to contain significant contamination from the natural gas being transported through the pipeline.

In the embodiment of FIG. 1, the water trap 24 includes a sight glass 36 covering part of the internal chamber 28. The sight glass 36 may be transparent so that the contents of the internal chamber 28 may be viewed and the water may be drained when the internal chamber 28 contains water. In another embodiment, the sight glass 36 may be an electronic sensor (not shown) that electronically determines the water level, so that a person maintaining the filtration system 10 can readily determine the water level to schedule drainage. The electronic sensor may further trigger electronic alerts (e.g., text messages, emails, etc.) to alert the necessary maintenance.

The filtration system 10 further includes a filter unit 40 for removing pollutants from the vented gasses. The filter unit 40, illustrated in FIGS. 2 and 3 and described in greater detail below, includes an inlet port 42 for receiving the vented gasses and an exit port 44 for allowing the vented gasses to exit the filter unit 40 once they have been filtered. The inlet port 42 may be, for example, a port, fitting, or other construction that enables the filter unit 40 to be coupled to the compressor station 12, either directly or indirectly, as discussed in greater detail below. Similarly, the exit port 44 may be a similar port, fitting, or other construction, or it may simply be an exit aperture or apertures (not shown) for simply venting the vented gasses to the atmosphere once they have been filtered. Those skilled in the art may devise multiple embodiments of these structures, and the term should be broadly constructed to encompass any such construction that functions as described.

In the embodiment of FIG. 1, a connection conduit 48 may be used for connecting the trap outlet port 30 with the inlet port 42 of the filter unit 40 so that the vented gasses from the water trap 24 are directed into the filter unit 40. The connection conduit 48 may be any suitable form of conduit, connection, or fitting suitable for making the operable connection between the water trap 24 (or, in another embodiment, directly with the compressor station 12) and the filter unit 40. The connection conduit 48 may further include a connection valve 50 to prevent flow from the filter unit 40 towards the water trap 24 through the connection conduit 48, and any other sensors, pumps, and/or other equipment that may be desired or required.

As illustrated in FIG. 1, the filtration system 10 may further include a water return line 52 connecting a drain port 46 of the filter unit 40 with the trap water return port 32 for returning the water from the filter unit 40 to the water trap 24. A water return valve 54 may be provided in the water return line 52 to prevent the vented gasses from traveling from the water trap 24 to the filter unit 40 through the water return line 52.

The filtration system 10 may further include an exhaust conduit 56 operably attached to the exit port 44 of the filter unit 40 to vent the gasses to the atmosphere, or otherwise. The exhaust conduit 56 may include an exhaust valve 58 to prevent flow of external gasses (or other fluids) into the filter unit 40. Furthermore, the exhaust conduit 56 may also include a pollution sensor 60, such as a benzene sensor or similar sensor, to determine if pollutants are being properly removed. The pollution sensor 60 can alert the operator if the filter unit 40 is in need of maintenance (e.g., replacing the filter or otherwise), or if there is some other problem that is resulting in the gasses not being properly filtered.

FIG. 2 is a sectional view of the filter unit 40 shown in FIG. 1. FIG. 3 is a sectional view of the filter unit 40 taken along line 3-3 in FIG. 2. As illustrated in FIGS. 2-3, the filter unit 40 includes a filter housing 62, and inlet chamber 64, and a pollution filter 70 for removing pollutants from the vented gasses. The inlet chamber 64 may include an inlet port 42 and openings 66 through the inlet chamber 64.

The connection conduit 48 of FIG. 1 is attached to the inlet port 42 so that the vented gasses from the connection conduit 48 enter the inlet chamber 64, illustrated in FIG. 2, and are forced through the openings 66. As illustrated in FIG. 2, the pollution filter 70 positioned within the filter housing 62 adjacent the inlet chamber 64 to cover the openings 66. The pollution filter 70 is adapted to remove the pollutants from the gasses.

In the embodiment of FIG. 2, the pollution filter 70 has an inwardly extending bore 72 shaped to receive the elongate inlet chamber 64 therein so that the pollution filter 70 completely surrounds the inlet chamber 64 and covers the openings 66. In this embodiment, the pollution filter 70 includes an outer layer 74 (e.g., a fibrous or fabric layer, or equivalent cover 80ing material or shell) that surrounds an inner core 76 that is adapted to remove the pollutants. The inner core 76 may be, for example, an activated charcoal that is suitable for removing organic wastes, benzene, and other pollutants. In one embodiment, the inner core 76 is composed of granulated activated charcoal, such as GAC-48C, GAC-48C-AW, or similar granulated activated charcoal known in the art. One type of acceptable granulated activated charcoal is sold under the name OIL GRAB™ by Hydrocarbon Absorbent Technologies, Inc.

In one embodiment, the filter housing 62 may be a rigid, generally cylindrical housing, although a wide variety of shapes and constructions may be utilized. In this embodiment, the pollution filter 70 is a generally cylindrical structure shaped and sized to fit within the filter housing 62. The inlet chamber 64 may be an elongate tubular structure positioned within the filter housing 62, although other shapes and dispositions may be devised by those skilled in the art, and should be considered within the scope of the present invention. The openings 66 of the inlet chamber 64 may extend entirely around the elongate tubular structure; although, in alternative embodiments, they may be positioned only on a certain face of a wall (not shown), or in any other arrangement considered acceptable to those skilled in the art.

In the embodiment of FIG. 2, an outlet chamber 78 is formed between the filter housing 62 and the pollution filter 70. Once the vented gasses have passed through the pollution filter 70, they pass into the outlet chamber 78, from which they can vent to the outside air. In the present embodiment, the gasses are directed through a top plate 90 of the filtration system 10. The top plate 90 is illustrated in FIG. 3, and is described in greater detail below.

As illustrated in FIG. 2, the filter housing 62 may further include a cover 80 that is adapted to abut and close an open end 82 of the filter housing 62. The pollution filter 70 may be removed and replaced through the open end 82 of this embodiment. An outer flange 84 extends around the open end 82 so that an annular locking ring 86 may be used to lock the cover 80 into the filter housing 62. The annular locking ring 86 includes an inwardly extending retaining ring 88 that engages a perimeter 89 of the cover 80 for locking the cover 80 onto the filter housing 62.

FIG. 3 is a top plan view of the top plate 90 of one embodiment of the filtration system 10. As illustrated in FIGS. 2 and 3, the top plate 90 includes a plurality of vent apertures 92 adjacent a plate perimeter 94, for venting the filtered gasses. In the embodiment of FIG. 4, only a top half 96 of the top plate 90 includes the vent apertures 92, and a bottom half 98 is solid, so that no water can pass through the top plate 90. In alternative embodiments, however, the top plate 90 may not be required, or it may be constructed in a different manner.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A filtration system for filtering water and pollutants from vented gasses, the filtration system comprising:
   a natural gas compressor station;
   a blowdown conduit operably connected with the gas compressor station to receive the vented gasses from the natural gas compressor station;
   a blowdown valve operably mounted in the blowdown conduit for preventing flow of the vented gasses back to the natural gas compressor station; and
   a filter unit comprising:
      a filter housing;
      an inlet chamber having an inlet port and openings through the inlet chamber, the inlet port being operably connected to the blowdown conduit to receive the vented gasses into the inlet chamber;
      a pollution filter positioned within the filter housing adjacent the inlet chamber to cover the openings, the pollution filter being adapted to remove the pollutants from the gasses;
      an exit port enabling the vented gasses to exit the filter housing once the pollutants have been removed by the pollution filter; and
      a drain port positioned in a lower portion of the filter housing to drain the water that enters the filter unit via the inlet chamber.

2. The filtration system of claim 1, further comprising an exhaust conduit operably attached to the exit port of the filter unit, the exhaust conduit having an exhaust valve and a pollution sensor.

3. The filtration system of claim 1, wherein the blowdown conduit further includes a water trap.

4. The filtration system of claim 3, wherein the water trap includes sight glass covering part of the internal chamber, so that the contents of the internal chamber may be viewed and the water may be drained when the internal chamber contains water.

5. The filtration system of claim 1, wherein the water trap includes a trap water drain port adapted to be operably engaged with a vacuum truck for draining an internal chamber of the water trap.

6. The filtration system of claim 1, wherein the pollution filter is generally cylindrical, the inlet chamber is an elongate tubular structure and positioned inside the pollution filter so that the pollution filter surrounds and covers the inlet chamber.

7. The filtration system of claim 6, wherein the filter housing surrounds the pollution filter so that an outlet chamber is formed between the filter housing and the pollution filter.

8. A filtration system for filtering water and pollutants from vented gasses, the filtration system comprising:
   a natural gas compressor station;
   a water trap that includes an internal chamber, a trap inlet port for receiving the vented gasses from the compressor station so that the water may fall out of the vented gasses into the internal chamber, a trap outlet port for allowing the vented gasses to exit the internal chamber, a trap water return port, and a trap water drain port for periodically draining the water from the internal chamber;
   a filter unit comprising:
      a filter housing;
      an inlet chamber having an inlet port and openings through the inlet chamber;
      a pollution filter positioned within the filter housing adjacent the inlet chamber to cover the openings, the pollution filter being adapted to remove the pollutants from the gasses;
      an exit port enabling the vented gasses to exit the filter housing once the pollutants have been removed by the pollution filter; and
      a drain port positioned in a lower portion of the filter housing to drain the water that enters the filter unit via the inlet chamber;
   a connection conduit for connecting the trap outlet port with the inlet port of the filter unit so that the vented gasses from the water trap are directed into the inlet chamber and through the pollution filter;
   a water return line connecting the drain port of the filter unit with the trap water return port for returning the water from the filter unit to the water trap; and
   a water return valve in the water return line to prevent the vented gasses from traveling from the water trap to the filter unit through the water return line.

9. The filtration system of claim 8, further comprising an exhaust conduit operably attached to the exit port of the filter unit, the exhaust conduit having an exhaust valve and a pollution sensor.

10. The filtration system of claim 8, wherein the water trap includes sight glass covering part of the internal chamber, so that the contents of the internal chamber may be viewed and the water may be drained when the internal chamber contains water.

11. The filtration system of claim 8, wherein the trap water drain port is adapted to be operably engaged with a vacuum truck for draining the internal chamber of the water trap.

12. The filtration system of claim 8, wherein the connection conduit includes a connection valve to prevent flow from the filter unit towards the water trap through the connection conduit.

* * * * *